United States Patent
Hosoda

(10) Patent No.: US 7,803,445 B2
(45) Date of Patent: Sep. 28, 2010

(54) OPTICAL RECORDING MEDIUM

(75) Inventor: Yasuo Hosoda, Saitama (JP)

(73) Assignee: Pioneer Corporation, Tokyo (JP)

( * ) Notice: Subject to any disclaimer, the term of this patent is extended or adjusted under 35 U.S.C. 154(b) by 444 days.

(21) Appl. No.: 11/884,933

(22) PCT Filed: Feb. 8, 2006

(86) PCT No.: PCT/JP2006/302168

§ 371 (c)(1),
(2), (4) Date: Oct. 10, 2007

(87) PCT Pub. No.: WO2006/090587

PCT Pub. Date: Aug. 31, 2006

(65) Prior Publication Data

US 2008/0279079 A1    Nov. 13, 2008

(30) Foreign Application Priority Data

Feb. 23, 2005 (JP) ............................ 2005-047212

(51) Int. Cl.
*B32B 3/02* (2006.01)

(52) U.S. Cl. ................... 428/64.1; 428/64.4; 428/64.6; 430/270.11

(58) Field of Classification Search ........................ None
See application file for complete search history.

(56) References Cited

U.S. PATENT DOCUMENTS

| 6,716,507 B2 * | 4/2004 | Tabata ..................... 428/64.1 |
| 2004/0222479 A1 * | 11/2004 | Uno et al. ................... 257/432 |

FOREIGN PATENT DOCUMENTS

| JP | 2004-158145 A | 6/2004 |
| JP | 2004-171631 A | 6/2004 |
| WO | 03/101750 A | 12/2003 |

OTHER PUBLICATIONS

International Search Report for PCT/JP2006/302168 mailed May 16, 2006.

* cited by examiner

*Primary Examiner*—Elizabeth Mulvaney
(74) *Attorney, Agent, or Firm*—Nixon & Vanderhye P.C.

(57) ABSTRACT

The main object of the present invention is to provide an optical recording medium with no need to use a control subject substance of the PRTR law, capable of using for an optical recording device with a blue laser, and giving consideration to the environmental aspect.

To attain the object, the present invention provides an optical recording medium comprising: a reflective layer containing an aluminum composition as the main component including both aluminum or an aluminum alloy and a metal oxide of a metal other than aluminum; and a dielectric protective layer, formed in contact with the reflective layer, containing a niobium composition as the main component including both silicon dioxide or titanium dioxide and a niobium nitrided oxide.

2 Claims, 1 Drawing Sheet

OPTICAL RECORDING MEDIUM

This application is the US national phase of international application PCT/JP2006/302168 filed 8 Feb. 2006 which designated the U.S. and claims benefit of JP 2005-047212, dated 23 Feb. 2005, the entire content of which is hereby incorporated by reference.

TECHNICAL FIELD

The present invention relates to an optical recording medium having a reflective layer and a dielectric protective layer in consideration to the environment.

BACKGROUND ART

Conventionally, as a recording medium for recording digital data, an optical recording medium represented by CD and DVD has widely been utilized. In the optical recording medium, in general, a reflective layer is formed in the inside regardless of its recording and reproduction system. Moreover, those having a dielectric protective layer formed adjacent to the reflective layer have often been used.

As such a reflective layer, in general, a thin film of gold, silver, aluminum, an alloy thereof, silicon, or the like is used. However, since the reflective layer using gold or silicon has a low reflectance with respect to a blue laser so that an optical recording medium using such a reflective layer cannot be used for an optical recording device using a blue laser for recording or reproducing the information. Moreover, since an optical recording medium having a reflective layer using aluminum or an alloy thereof has a relatively large crystal particle size of the aluminum or the like, in the case where it is used for an optical recording device using a blue laser, a problem is involved in that sufficient recording and reproducing characteristics cannot be obtained due to the large noise.

Moreover, although a reflective layer using silver or a silver alloy is compatible to a device using a blue laser, problems are involved in that its cost is high and that the silver is a control subject of the "Law Concerning Reporting, etc. of Releases to the Environment of Specific Chemical Substances and Promoting Improvements in Their Management" (hereinafter, it is also referred to as the PRTR law). Moreover, in general, a composition made of a zinc sulfide and a silicon dioxide is used for a dielectric protective layer to be formed in contact with the reflective layer so that in the case where silver is used for the reflective layer, it can easily be corroded by the sulfur included in the zinc sulfide in the dielectric protective layer, and thus it is also problematic.

Furthermore, as to the zinc in the zinc sulfide used as the material for the dielectric protective layer, it is a control subject of the PRTR law so that a problem of the concern to the influence on the environment is involved.

A prior art concerning the present invention is not found.

DISCLOSURE OF THE INVENTION

Problems to be Solved by the Invention

Then, desired is a provision of an optical recording medium with no need to use a control subject substance of the PRTR law, capable of using for an optical recording device with a blue laser, and giving consideration to the environmental aspect.

Means for Solving the Problem

The present invention provides an optical recording medium comprising: a reflective layer containing an aluminum composition as the main component including both aluminum or an aluminum alloy and a metal oxide of a metal other than aluminum; and a dielectric protective layer, formed in contact with the reflective layer, containing a niobium composition as the main component including both silicon dioxide or titanium dioxide and a niobium nitrided oxide.

DESCRIPTION OF THE NUMERALS

Figure 1:
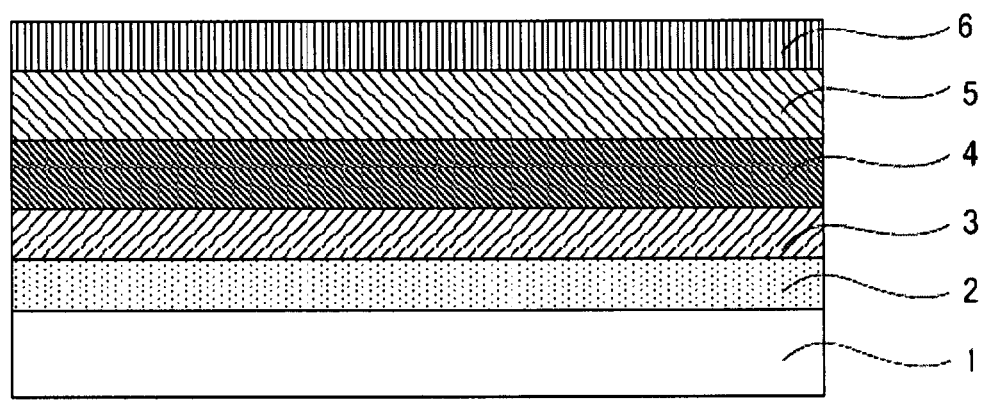
FIG. 1 is a schematic cross-sectional view showing an example of an optical recording medium of the present invention.

| | |
|---|---|
| 1 | substrate |
| 2 | reflective layer |
| 3 | dielectric protective layer |
| 4 | recording layer |
| 5 | second dielectric protective layer |
| 6 | cover layer |

BEST MODES FOR CARRYING OUT THE INVENTION

The present invention relates to an optical recording medium having a reflective layer and a dielectric protective layer in consideration to the environment. Hereinafter, the present invention will be explained in detail.

An optical recording medium comprising: a reflective layer containing an aluminum composition as the main component including both aluminum or an aluminum alloy and a metal oxide of a metal other than aluminum; and a dielectric protective layer, formed in contact with the reflective layer, containing a niobium composition as the main component including both silicon dioxide or titanium dioxide and a niobium nitrided oxide.

In the present invention, since the niobium composition is contained as the main component in the dielectric protective layer, the substance contained in the dielectric protective layer has a little effect to the reflective layer formed adjacent thereto. Moreover, since the aluminum composition is contained in the reflective layer as the main component, also from this point, the substance contained in the dielectric protective layer has a little effect to the reflective layer. Moreover, since the aluminum composition is used for the reflective layer, an optical recording medium preferable also in terms of the cost can be provided.

Moreover, since both niobium and aluminum is not the control subject of the PRTR law, an optical recording medium giving consideration to the environmental aspect can be provided. Furthermore, in the present invention, since a metal oxide is contained in the aluminum composition, fine crystal particles of the aluminum or the aluminum alloy can be provided so that the optical recording medium of the present invention can be usable for an optical recording device using a blue laser, and thus it is advantageous.

Hereinafter, an optical recording medium in the present invention will be explained in detail for each configuration.

1. Reflective Layer

First, a reflective layer to be used for an optical recording medium of the present invention will be explained. The reflective layer to be used for an optical recording medium of the present invention contains an aluminum composition as the main component including both aluminum or an aluminum alloy and a metal oxide of a metal other than aluminum. In general, the aluminum composition is contained in the reflective layer in a range of 50% by weight to 100% by weight, in particular, it is preferably contained in a range of about 80% by weight to 100% by weight. According to the range, a highly stable layer with a high function as a reflection layer can be provided.

Here, as to the content of the metal oxide of a metal other than aluminum contained in the aluminum composition, it is preferably in a range of 0.02 atm % (atomic %) to 2.5 atm %, and more preferably in a range of 0.02 atm % to 1.0 atm %. According to the range, the reflection efficiency of the reflective layer can be provided favorably, and moreover, the smaller size of the crystal particles of the aluminum or the aluminum alloy can be provided.

Specific examples of the metal oxide include tin dioxide ($SnO_2$), titanium oxide (TiO) and niobium oxide ($Nb_2O_3$). In the present invention, it is preferable to use tin dioxide ($SnO_2$) in terms of obtaining a favorable layer deposition rate in the sputtering process, high productivity, easy accessibility and relative inexpensiveness.

Moreover, it is preferable that the aluminum alloy is an alloy of aluminum and one or two or more metals from palladium (Pd), gold (Au), platinum (Pt), thallium (Tl), lead (Pb), bismuth (Bi), osmium (Os), iridium (Ir), ruthenium (Ru), Rhodium (Rh), indium (In), tin (Sn), nickel (Ni), zinc (Zn), copper (Cu), cadmium (Cd), titanium (Ti), zirconium (Zr), hafnium (Hf), vanadium (V), niobium (Nb), tantalum (Ta), chromium (Cr), molybdenum (Mo), tungsten (W) and technetium (Tc).

In the present invention, among the above-mentioned ones, it is preferable to use an alloy of aluminum and a metal other than the control subject of the PRTR law in terms of the environmental concern. Furthermore, an alloy of aluminum and a metal of a relatively large atomic number such as palladium (Pd), gold (Au) and platinum (Pt) is preferable for the large effect of making smaller the average particle size of the crystal particles of the reflective layer. Moreover, in this case, a metal other than aluminum is contained in the aluminum alloy preferably in a range of 0.04 atm % to 10 atm %, more preferably in a range of 0.1 atm % to 6.0 atm %, and still more preferably in a range of 0.4 atm % to 2.0 atm %.

Here, the thickness of the reflective layer mentioned above is selected appropriately according to the kind of the optical recording medium. It is in general about 5 nm to 300 nm, and preferably about 20 nm to 200 nm. Thereby, the reflective layer can have sufficient reflectance.

Moreover, in the present invention, it is preferable that the average particle size of the crystal particles of the aluminum or aluminum alloy is sufficiently small with respect to about 470 nm as the laser spot size of an optical recording device using a blue laser. Specifically, it is preferably 94 nm, which is $\frac{1}{5}$ of 470 nm, or less, more preferably 47 nm, which is $\frac{1}{10}$ thereof, or less, and still more preferably 31 nm, which is $\frac{1}{15}$ thereof, or less. Thereby, even in the case of using an optical recording medium of the present invention for an optical recording device using a blue laser, one with little noise can be provided.

Here, although the method for forming the reflection layer mentioned above is not particularly limited, in the present invention, it is particularly preferable that the reflective layer is formed by the sputtering process. Thereby, the reflective layer as mentioned above can easily be formed. Specific examples of the sputtering process for forming the reflective layer include a method of forming a film on a substrate by sputtering a sputtering target where the metal oxide is added to pure aluminum or the aluminum alloy, and a method of preparing sputtering targets which are pure aluminum or an aluminum alloy and the metal oxide separately, and introducing the aluminum or aluminum alloy and the metal oxide into a sputtering atmosphere for forming a layer on a substrate (co-sputtering process).

2. Dielectric Protective Layer

Next, a dielectric protective layer to be used for the present invention will be explained. The dielectric protective layer to be used for the present invention is formed in contact with the reflective layer mentioned above, and it contains a niobium composition as the main component including both silicon dioxide or titanium dioxide and a niobium nitrided oxide.

In the present invention, it is preferable that the niobium composition is contained in the dielectric protective layer in a range of 50% by weight to 100% by weight, in particular, about 80% by weight to 100% by weight. According to the range, a layer having high function as a dielectric protective layer, and containing little substance which poses adverse effect to the reflective layer can be provided.

Moreover, in this case, the content of the silicon dioxide or titanium dioxide contained in the niobium composition is preferably in a range of 1% by weight to 96% by weight, in particular, in a range of 1% by weight to 30% by weight. According to the range, a layer having high function as a dielectric protective layer, and having high transparency can be provided.

Moreover, it is preferable that nitrogen is contained in the niobium nitrided oxide in a range of 0.1 atm % to 10 atm %, in particular, in a range of 1 atm % to 3 atm %, and oxygen is contained therein in a range of 50 atm % to 71 atm %, in particular, in a range of 60 atm % to 70 atm %. According to a niobium nitrided oxide having such a composition, the free oxygen present in the niobium nitrided oxide can be reduced so that a dielectric protective layer having a high barrier property, and having little reducing function with respect to the reflective layer can be provided.

The thickness of the dielectric protective layer can be selected appropriately according to the application of the optical recording medium. It is in general about 3 nm to 200 μm, and it is preferably about 25 nm to 36 nm.

Here, although the method for forming the dielectric protective layer as mentioned above is not particularly limited, in the present invention, it is particularly preferable that the dielectric protective layer is formed by the sputtering process. Thereby, the dielectric protective layer as mentioned above can easily be formed. Specific examples of the sputtering process for forming the dielectric protective layer include a method of forming a film on the reflective layer by sputtering a sputtering target, where titanium oxide or silicon oxide is added to niobium oxide ($Nb_2O_3$), in the presence of nitrogen, and a method of preparing sputtering targets which are niobium oxide and titanium oxide or silicon oxide separately, and sputtering in the presence of nitrogen for forming a layer on the reflective layer (co-sputtering process). By carrying out the sputtering process in the presence of nitrogen, the valence deficient portion of the niobium oxide can be compensated with the nitrogen so that a thin film containing the niobium composition mentioned above can be formed.

3. Optical Recording Medium

The layer configuration of the optical recording medium of the present invention is not particularly limited as long as it has the reflective layer and the dielectric protective layer. For example, as shown in FIG. 1, a configuration having a substrate 1, the reflective layer 2 formed on the substrate 1, a dielectric protective layer 3 formed on the reflective layer 2, a recording layer 4 formed on the dielectric protective layer 3, a second dielectric protective layer 5 formed on the recording layer 4, and a cover layer 6 formed on the second dielectric protective layer 5 can be used. Moreover, in this case, a configuration with the substrate and cover layer interchanged may also be used.

Moreover, a configuration without the cover layer or substrate, a configuration having two reflective layers, and furthermore, a configuration with one or more recording medium configuration added for enabling the multiple layer recording may also be used. Moreover, a configuration having a layer other than the above-mentioned ones may also be employed.

Moreover, also the application of the optical recording medium of the present invention is not particularly limited. For example, a rewritable type optical recording medium using a phase change material for the recording layer, moreover, an write once type (organic dye type) optical recording medium using an organic dye for the recording layer, and an (inorganic) write once type optical recording medium using an inorganic material for the recording layer may be used. Moreover, an optical recording medium dedicated for reproduction may also be used.

In the present invention, in particular, a write once type or rewritable type optical recording medium is preferable. In general, the reflective layer and dielectric protective layer are formed in such an optical recording medium so that the advantages of the present invention can be utilized.

Moreover, the optical recording medium of the present invention can be used for an optical recording device using a light source other than a blue laser. However, since the advantages of the present invention can be utilized, an optical recording medium to be used for an optical recording device using a blue laser for recording or reproducing the information is particularly preferable.

Here, in the present invention, as to the substrate, the recording layer, the protection layer or the like, those formed using a substance other than the control subject of the PRTR law are preferable. Thereby, as the entire optical recording medium, one not using the control subject of the PRTR law can be provided so that an optical recording medium giving consideration to the environment can be provided.

Hereinafter, the second dielectric protective layer, the substrate, the recording layer and the protection layer to be used for the present invention will be explained.

(Second Dielectric Protective Layer)

As a second dielectric protective layer to be used for the present invention, the same dielectric protective layer used for a general optical recording medium can be used. In the present invention, in particular, the second dielectric protective layer is preferably the same layer as the dielectric protective layer, that is, a layer containing a niobium composition as the main component. Thereby, influence of the substance contained in the second dielectric protective layer on the other layers can be reduced so that a high quality optical recording medium can be provided. Moreover, since one not containing the control subject of the PRTR law can be provided, an optical recording medium giving consideration to the environment can be provided. The thickness of such second dielectric protective layer is in general by about 3 nm to 200 μm.

(Substrate)

Next, a substrate to be used for the present invention will be explained. The substrate to be used for the present invention may be same as a substrate used for a general optical recording medium such as polycarbonate and the like. In particular, in the present invention, it is preferable to use a substrate using a substance other than the control subject of the PRTR law. Examples of the substrate include a substrate using amorphous polyolefin or an acrylic resin. Moreover, in the present invention, in particular, a substrate using a biodegradable resin or a resin derived from a living creature is preferable. Thereby, an optical recording medium giving further consideration to the environment can be provided.

Examples of the resin include a starch resin using as the raw material corn, rice or potato; a resin as a mixture of the starch resin and polypropylene, polyethylene, polycarbonate or polylactic acid; an aliphatic polyester resin such as polylactic acid, polyglycol acid, and polycaprolactone; and a cellulose.

In general, a recording pit or a recording guide groove is formed on the substrate surface. In the present invention, a substrate can be obtained by forming such a recording pit or a recording guide groove directly on the resin, or obtained by forming an ultraviolet curable resin layer on the resin, and forming a recording pit or a guide groove by processing the ultraviolet curable resin layer.

(Recording Layer)

Next, a recording layer to be used for the present invention will be explained. As a recording layer to be used for the present invention, the same recording layer used for a general optical recording medium can be used. However, in the present invention, as mentioned above, one formed using substance other than the control subject of the PRTR law is preferable. An example of the recording layer includes a layer containing a composition as the main component including both a nitride of any of bismuth (Bi), tin (Sn) and iron (Fe) and one or two or more nitrides of germanium (Ge), silicon (Si), titanium (Ti) and aluminum (Al). Moreover, for example, as it is disclosed in Japanese Patent Application Laid-Open No. 2004-284242, a layer containing an alloy represented by the general formula $(Ti_xM1_{1-x})_yM2_{1-y}$ (wherein M1 is an element either one of silicon (Si) and aluminum (Al), M2 is an element other than M1 and titanium (Ti), $0.3 \leq x \leq 0.8$, and $0.75 \leq y \leq 1$) may be used. Moreover, for example, as it is disclosed in Japanese Patent Application Laid-Open No. 2004-284241, a layer containing an alloy as the main component including at least two elements selected from the group consisting of iron (Fe), aluminum (Al) and silicon (Si) may be used as well.

(Cover Layer)

Moreover, as a cover layer to be used for the present invention, the same cover layer used for a general optical recording medium can be used. In the present invention, as mentioned above, those formed using a substance other than the control subject of the PRTR law are preferable.

Examples of the cover layer include a layer formed by applying an ultraviolet curable resin, a thermosetting resin, a ultraviolet curable resin in combination with thermosetting, or a solvent volatile curable resin by a general coating method, and formed by laminating the sheet-shaped resin.

The present invention is not limited to the embodiments. The above-mentioned embodiments are examples, and any one having the substantially same configuration as the technological concept mentioned in the claims of the present invention and providing the same effects can be included in the technological scope of the present invention.

EXAMPLES

Hereinafter, with reference to the examples, the present invention will be explained further specifically.

Example 1

On an amorphous polyolefin disc substrate with 1.1 mm thickness, 12 cm diameter and 0.320 μm pitch spiral groove, a reflective layer (Al—Pd—$SnO_2$), a dielectric protective layer (Nb—Si—O—N), a recording layer (Bi—Ge—N) and a second dielectric protective layer (Nb—Si—O—N) were deposited in this order by the sputtering process. The thickness of each one were 50 nm, 30 nm, 15 nm and 24 nm respectively. Thereinafter, as an incident side substrate (cover layer), a 0.1 mm thickness ultraviolet curable resin layer was laminated onto the second dielectric protective layer.

Here, the reflective layer is a layer obtained by sputtering in argon (Ar) atmosphere of 0.2 Pa using a sputtering target where 2.0% by weight of tin dioxide ($SnO_2$) was added to an aluminum alloy of aluminum and palladium.

According to analysis with an inductively-coupled plasma atomic emission spectrometry (ICP-AES) of the reflective layer, palladium (Pd) was contained in the aluminum by about 4 atm %, and tin dioxide ($SnO_2$) was contained by about 1 atm %.

Moreover, the dielectric protective layer and second dielectric protective layer are layers obtained by sputtering in argon (Ar)+nitrogen ($N_2$ (5%)) atmosphere of 0.4 Pa using a sputtering target of a mixture of a niobium oxide ($Nb_2O_3$) and silicon dioxide ($SiO_2$) ($SiO_2$: 18% by weight).

According to analysis with a X ray photoelectron spectroscopy (XPS) of the formed dielectric protective layer and second dielectric protective layer, the atomic ratio was niobium (Nb): 20 atm %, silicon (Si): 10 atm %, oxygen atom (O): 67 atm %, and nitrogen atom (N): 3 atm %.

Moreover, the recording layer is a layer obtained by sputtering in argon (Ar)+nitrogen ($N_2$ (22%)) atmosphere of 0.6 Pa using a sputtering target of Bi—Ge.

As a result of the analysis with the X ray photoelectron spectroscopy of the recording layer, the atomic ratio was bismuth (Bi): 10 atm %, Bi—N: 62 atm %, and Ge—N: 28 atm %.

(Evaluation)

A 1-7 modulation random pattern was recorded on the guide groove surface projecting to the light incident side using an optical head with a 405 nm wavelength and a 0.85 numeric aperture of the objective lens by a 4.92 mm/s linear speed. For the recording operation, a multi-pulse was used with a 15.15 nsec window width. After recording, the jitter value was measured. Preferable jitter value of 6.3% was obtained, and it was confirmed that this optical recording medium shows a sufficient practical use.

Examples 2 to 12

An optical recording medium was produced in the same manner as in the example 1 except that polycarbonate (PC) was used for the substrate, a polycarbonate (PC) sheet laminated with a ultraviolet curable resin was used for the cover layer, and the thicknesses of the dielectric protective layer, recording layer and second dielectric protective layer were changed as shown in the table 1.

(Evaluation)

According to the measurement of the jitter value in the same manner as in the example 1, as shown in the table 1, a preferable jitter value was obtained in any case, and it shows sufficient practical use.

TABLE 1

| | Substrate PC | Reflective layer Al—Pd—SnO$_2$ | Dielectric protective layer Nb—Si—O—N | Recording layer Bi—Ge—N | Second dielectric protective layer Nb—Si—O—N | Cover layer PC | Jitter value |
|---|---|---|---|---|---|---|---|
| Example 2 | 1.1 mm | 50 nm | 28 nm | 12 nm | 25 nm | 0.1 mm | 7.1 |
| Example 3 | 1.1 mm | 50 nm | 30 nm | 12 nm | 25 nm | 0.1 mm | 6.9 |
| Example 4 | 1.1 mm | 50 nm | 36 nm | 12 nm | 25 nm | 0.1 mm | 7.1 |
| Example 5 | 1.1 mm | 50 nm | 30 nm | 12 nm | 15 nm | 0.1 mm | 7.1 |
| Example 6 | 1.1 mm | 50 nm | 20 nm | 12 nm | 30 nm | 0.1 mm | 7.9 |
| Example 7 | 1.1 mm | 50 nm | 25 nm | 12 nm | 30 nm | 0.1 mm | 7.3 |
| Example 8 | 1.1 mm | 50 nm | 32 nm | 12 nm | 22 nm | 0.1 mm | 6.9 |
| Example 9 | 1.1 mm | 50 nm | 30 nm | 13 nm | 24 nm | 0.1 mm | 6.9 |
| Example 10 | 1.1 mm | 50 nm | 30 nm | 14 nm | 24 nm | 0.1 mm | 6.3 |
| Example 11 | 1.1 mm | 50 nm | 30 nm | 15 nm | 24 nm | 0.1 mm | 6.3 |
| Example 12 | 1.1 mm | 30 nm | 30 nm | 14 nm | 24 nm | 0.1 mm | 6.9 |

Examples 13 to 16

An optical recording medium was produced in the same manner as in the example 1 except that polycarbonate (PC) was used for the substrate, a polycarbonate (PC) sheet laminated with a ultraviolet curable resin was used for the cover layer, and the second dielectric protective layer was a layer containing as the main component a niobium composition containing titanium oxide and niobium nitrided oxide (Nb—Ti—O—N) with the thicknesses as shown in the table 2.

The second dielectric protective layer is a layer obtained by sputtering in Ar+N$_2$ (5%) atmosphere of 0.37 Pa using a sputtering target of Nb$_2$O$_3$—TiO$_2$ (TiO$_2$: 96% by weight).

According to the measurement of the jitter value in the same manner as in the example 1, as shown in the table 2, a preferable jitter value was obtained in any case, and it shows sufficient practical use.

Examples 17 to 20

An optical recording medium was produced in the same manner as in the example 1 except that the material for the cover layer and the material for the substrate were changed as shown in the table 3. As to the substrates used for the examples 17 to 20, an ultraviolet curable resin layer was formed on a resin layer of a starch resin and a polypropylene (PP) resin (50:50) or a resin layer made of a starch resin, with a recording guide groove formed by processing the ultraviolet curable resin layer.

According to the measurement of the jitter value in the same manner as in the example 1, as shown in the table 3, a preferable jitter value was obtained in any case, and it shows sufficient practical use. Thereby, even in the case where the substrate was made of a raw material other than the control subject of the PRTR law or a biodegradable raw material, and it was confirmed that it shows a sufficient practical use.

TABLE 2

| | Substrate PC | Reflective layer Al—Pd—SnO$_2$ | Dielectric protective layer Nb—Si—O—N | Recording layer Bi—Ge—N | Second dielectric protective layer Nb—Ti—O—N | Cover layer PC | Jitter value |
|---|---|---|---|---|---|---|---|
| Example 13 | 1.1 mm | 50 nm | 30 nm | 14 nm | 15 nm | 0.1 mm | 7.5 |
| Example 14 | 1.1 mm | 50 nm | 30 nm | 14 nm | 8 nm | 0.1 mm | 6.8 |
| Example 15 | 1.1 mm | 50 nm | 30 nm | 14 nm | 5 nm | 0.1 mm | 7.2 |
| Example 16 | 1.1 mm | 50 nm | 30 nm | 15 nm | 10 nm | 0.1 mm | 6.5 |

TABLE 3

|  | Substrate |  | Reflective layer Al—Pd—SnO$_2$ | Dielectric protective layer Nb—Si—O—N | Recording layer Bi—Ge—N | Second dielectric protective layer Nb—Si—O—N | Cover layer |  | Jitter value |
|---|---|---|---|---|---|---|---|---|---|
| Example 17 | (1) Starch resin + PP resin (2) Ultraviolet curable resin | 1.1 mm | 50 nm | 30 nm | 15 nm | 24 nm | Polycarbonate | 0.1 mm | 6.3 |
| Example 18 | (1) Starch resin + PP resin (2) Ultraviolet curable resin | 1.1 mm | 50 nm | 30 nm | 15 nm | 24 nm | Amorphous polyolefin | 0.1 mm | 6.9 |
| Example 19 | (1) Starch resin (2) Ultraviolet curable resin | 1.1 mm | 50 nm | 30 nm | 15 nm | 24 nm | Polycarbonate | 0.1 mm | 6.4 |
| Example 20 | (1) Starch resin (2) Ultraviolet curable resin | 1.1 mm | 50 nm | 30 nm | 15 nm | 24 nm | Amorphous polyolefin | 0.1 mm | 6 |

Example 21

An optical recording medium was produced in the same manner as in the example 1 except that a second dielectric protection with sulfur oxide and silicon dioxide as the main component was used. The thickness of each formed layer were 50 nm for the reflective layer, 30 nm for the dielectric protective layer, 15 nm for the recording layer and 25 nm for the second dielectric protective layer.

(Evaluation)

According to the measurement of the jitter value in the same manner as in the example 1, a preferable jitter value of 6.3% was obtained, and it was confirmed that this optical recording medium shows a sufficient practical use.

The invention claimed is:

1. An optical recording medium comprising: a reflective layer containing an aluminum composition as the main component including both aluminum or an aluminum alloy and a metal oxide of a metal other than aluminum; and a dielectric protective layer, formed in contact with the reflective layer, containing a niobium composition as the main component including both silicon dioxide or titanium dioxide and a niobium nitrided oxide wherein the metal oxide contained in the reflective layer is $SnO_2$, $TiO_2$ or $Nb_2O_3$.

2. The optical recording medium according to claim 1, comprising a recording layer formed on the dielectric protective layer, and a second dielectric protective layer, formed on the recording layer, containing the niobium composition as the main component.

* * * * *